Nov. 22, 1966  J. F. HIGGINS  3,287,457
PROCESS FOR MANUFACTURING BETA PHASE QUINACRIDONE
Filed Jan. 10, 1964  2 Sheets-Sheet 1
FIG. I
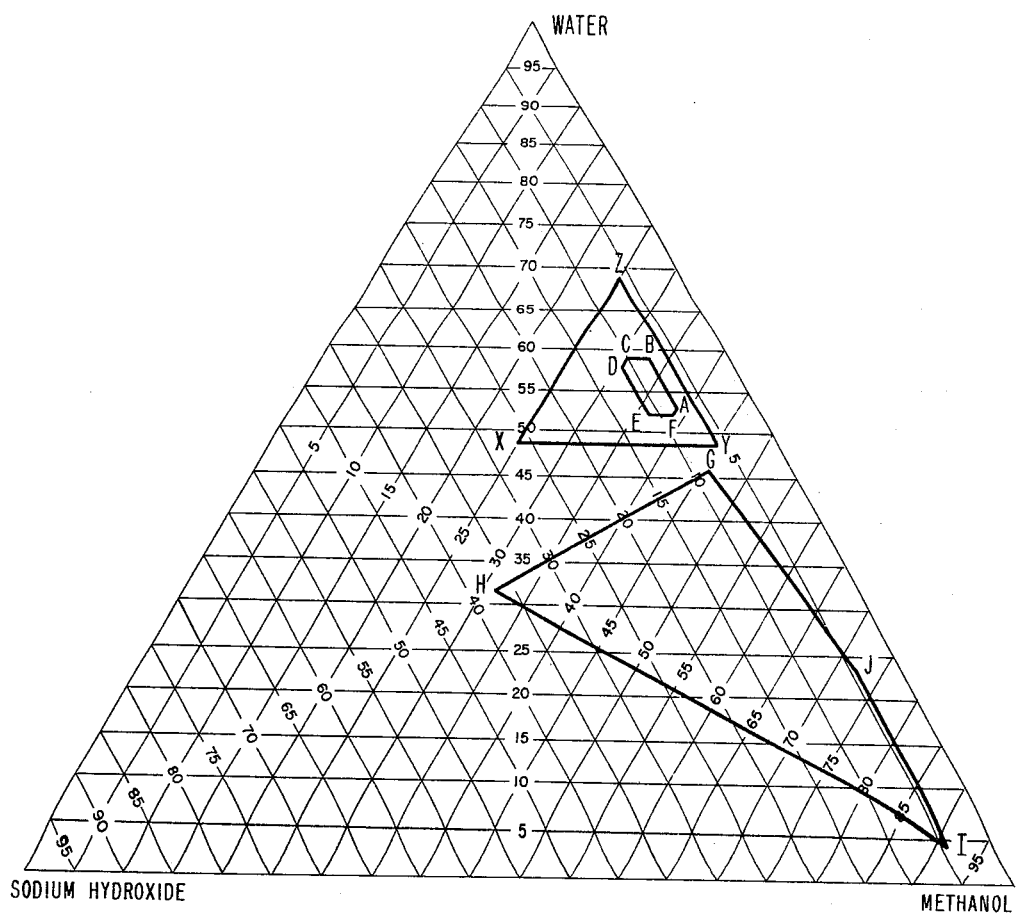
INVENTOR
JAMES F. HIGGINS
BY *James J. F. Flynn*
ATTORNEY Nov. 22, 1966     J. F. HIGGINS     3,287,457
PROCESS FOR MANUFACTURING BETA PHASE QUINACRIDONE
Filed Jan. 10, 1964     2 Sheets-Sheet 2
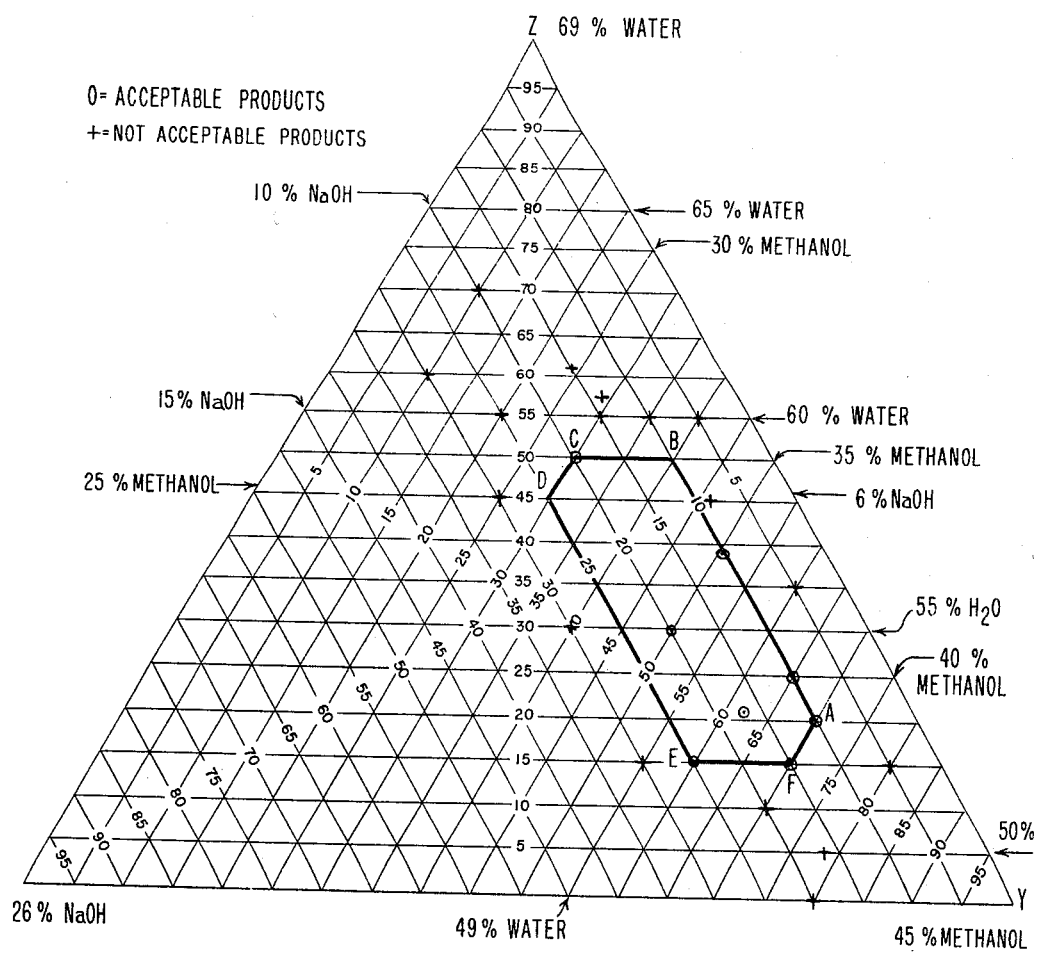
FIG. II
INVENTOR
JAMES F. HIGGINS 3,287,457
PROCESS FOR MANUFACTURING BETA PHASE QUINACRIDONE
James F. Higgins, Livingston, N.J., assignor to E. I. du Pont de Nemours and Company, Wilmington, Del., a corporation of Delaware
Filed Jan. 10, 1964, Ser. No. 336,959
4 Claims. (Cl. 260—279)

This invention relates to a new process for the manufacture of beta phase quinacridone, and more particularly, it pertains to a process for the manufacture of beta phase quinacridone of high tinctorial strength which requires less rigorous conditions for conversion to pigmentary particle sizes than has been characteristic of prior art beta phase quinacridones.

Beta phase quinacridone is a known product which was first described in U.S. Patent 2,844,485 and was prepared by salt milling a crude quinacridone in the presence of a selected hydrocarbon solvent such as xylene. At that time, beta phase quinacridone was not available directly through the synthesis of quinacridone. Later, however, U.S. Patent 2,969,366 issued which disclosed a process for making beta phase quinacridone by direct oxidation of dihydroquinacridone to quinacridone by the use of selected concentrations of the alkali, water and alcoholic solvent used in the oxidation step. In order to obtain a satisfactory beta phase quinacridone by the process described in this patent certain critical conditions must be followed. The patent teaches that the amount of the organic solvent that is used in the process must be at least as much as the amount of water present and that the amount of alkali must be in the range of from 20–120 parts alkali per 100 parts of water, with the further provision that there be at least 5 parts of alkali per 100 parts of total liquid used. The products obtained under the conditions specified in U.S. Patent 2,969,366 have been beta phase quinacridone pigments. However, these products have been only crude pigments and have required prolonged milling cycles for suitable particle size reduction to meet the exacting demands of the pigment industry with respect to tinctorial properties and color strength. Recent studies have further indicated that some reaction conditions outside of this range still make beta phase quinacridones but there has been a pronounced tendency toward obtaining crude pigments having even lower tinctorial strengths as the limits defined in the patent are exceeded. This has been particularly true when the water/solvent ratio has been altered in the direction of having more water present than solvent. It has been thought, up to the time of the present invention, that there is a reduction in tinctorial strength of the quinacridone pigment produced by the process described in the above noted patent as the amount of water, relative to the amount of solvent, is increased. It has now been found that this tendency suddenly, and quite unexpectedly, reverses itself, so that the products prepared from oxidation reactions of dihydroquinacridone to quinacridone conducted in media containing water, a solvent and an alkali in certain critical amounts, are not only consistently found in the beta phase but are also consistently found to have a much higher tinctorial strength than has been characteristic of previous crude beta phase quinacridones. This property of the crude pigment is reflected in marked reductions in the milling cycles required in the particle size reduction step to achieve a desired degree of depth and blueness of the full shade (masstone) and desired tinctorial strength.

It is an object of this invention, therefore, to provide a process for preparing beta phase quinacridone having a considerably higher tinctorial strength than has heretofore been possible within the limits of previously known processes for its preparation. It is a further object of this invention to provide a process for preparing beta phase quinacridone of a quality which will give substantially reduced milling cycles in the particle size reduction step which has always been necessary in the preparation of pigmentary products.

It has now been found that 6,13-dihydroquinacridone can be oxidized to beta phase quinacridone of high tinctorial strength when the oxidation is done by the use of an oxidizing agent such as nitrobenzene sodium sulfonate, in a liquid mixture comprising 52 to 59% water, 31 to 39% methanol, and 8 to 11% sodium hydroxide.

More specifically, in a preferred embodiment of this invention, 6,13-dihydroquinacridone is suspended in a liquid medium comprising about 56.5% water, 35.5% methanol, and 8% sodium hydroxide. During the reaction of the alkali hydroxide with the dihydroquinacridone the temperature of the solution is maintained between the ambient temperature and about 40° C. After agitating the solution for a substantial period of time, the dihydroquinacridone is oxidized to quinacridone by the introduction of nitrobenzene-m-sodium sulfonate followed by heating the mixture at the reflux. The product is finally isolated by filtering, washing free of alkali and drying and is found to be a beta phase quinacridone of much higher tinctorial strength than the previously known crude beta phase quinacridones.

The following examples are given to illustrate the invention in still more detail but are not to be considered as limiting the teaching of the invention. Unless otherwise specified, all parts are given in terms of parts by weight.

*Example 1*

100 parts of 6,13-dihydroquinacridone is dispersed in a solution of 780 parts methanol in 1090 parts water and stirred for about 15 minutes until thoroughly wet. 360 parts of a 50% solution of sodium hydroxide is then added and the mixture stirred for 1½ hours with the temperature maintained below 40° C. 75 parts of nitrobenzene-m-sodium sulfonate is then added in the dry form to the slurry which is then heated to the boil and boiled under reflux for 2½ hours. The charge is then filtered, washed with water until it is free of alkali when tested on brilliant yellow paper and dried at 60° C. to yield 99 parts of a violet colored beta phase quinacridone. The product is characterized as beta phase quinacridone both by its violet color and by its X-ray diffraction pattern which correspond in all ways with that set forth in U.S. Patent 2,844,485. When dispersed in an oleoresinous vehicle by conventional means and tested for its tinctorial strength, it is found to exhibit a substantially higher tinctorial strength than those skilled in the art have found it possible to obtain in the products produced following the prior art processes. This increased tinctorial strength of the crude pigment reflects itself in improved behaviour of the pigment in subsequent particle size reduction steps. For instance, it has been characteristic of the prior art crude beta phase quinacridone pigment made according to the disclosures of U.S. Patent 2,969,366 that it requires from 6 to 8 hours of milling by a well known prior art milling process to achieve the desired combination of high tinctorial strength, depth of masstone and blueness of masstone. In contrast, in the same milling process, with the product of this example, a milling cycle of 4 hours produces the desired strength and depth of masstone and even more blueness of masstone, a desirable attribute. When the prior art product is milled for only 4 hours, it is extremely light and yellow in masstone.

*Example 2*

100 parts of dihydroquinacridone is dispersed in a solution of 780 parts methanol in 690 parts water and stirred until thoroughly wet after which 360 parts of a 50% solution of sodium hydroxide in water is added and the charge stirred for about 1 hour maintaining the temperature at less than 40° C. at all times. Thereafter, a solution of 75 parts nitrobenzene-m-sodium sulfonate in 300 parts water is added rapidly and stirring continued for a short time after which the charge is heated to the boil and boiled under reflux for 2½ hours. The product is isolated by filtering, washing alkali-free as indicated by a test on brilliant yellow paper and drying at 60° C. 99 parts of a brilliant violet colored powder is obtained which is shown both by its color and by its X-ray diffraction pattern to be beta phase quinacridone. The tinctorial strength is similar to that of the product obtained in Example 1 and is markedly superior to the tinctorial strength of products obtained following the teachings of U.S. Patent 2,969,366.

The following Table I summarizes the percentage compositions of the Examples 1 and 2 given above as well as compositions which have been shown to be effective (see Examples 3–9) and fall within the critical limits disclosed.

TABLE I

| Example | NaOH | Water | Methanol | Phase of Product | Strength of Product |
|---|---|---|---|---|---|
| 1 | 8.1 | 56.9 | 35.0 | Beta | Strong. |
| 2 | 8.5 | 54.9 | 36.6 | ---do------- | Do. |
| 3 | 9.4 | 53.2 | 37.4 | ---do------- | Do. |
| 4 | 8.0 | 53.0 | 39.0 | ---do------- | Do. |
| 5 | 8.0 | 54.0 | 38.0 | ---do------- | Do. |
| 6 | 9.0 | 52.0 | 39.0 | ---do------- | Do. |
| 7 | 10.0 | 55.0 | 35.0 | ---do------- | Do. |
| 8 | 10.0 | 59.0 | 31.0 | ---do------- | Do. |
| 9 | 11.0 | 52.0 | 37.0 | ---do------- | Do. |

On the other hand, the following Table II sets forth a series of compositions which fall outside the critical limits defined herein, and it is apparent that the products made under these conditions fail to meet the criteria of the desired products of this invention in that they either make gamma phase quinacridone, mixtures of phases of quinacridone or, where they did produce beta phase products, all were extremely weak beta phase crude quinacridones more or less characteristic of those heretofore known in the prior art.

TABLE II

| Example | NaOH | Water | Methanol | Phase of Product | Strength of Product |
|---|---|---|---|---|---|
| 10 | 7 | 60 | 33 | Gamma | |
| 11 | 7 | 56 | 37 | Mixed | |
| 12 | 7 | 52 | 41 | ---do------- | |
| 13 | 7.8 | 58 | 34.2 | ---do------- | |
| 14 | 8 | 60 | 32 | Beta | Weak. |
| 15 | 8.7 | 60.5 | 30.8 | Gamma | |
| 16 | 9.0 | 61.2 | 29.8 | ---do------- | |
| 17 | 9 | 60 | 31 | Beta | Weak. |
| 18 | 9.3 | 50 | 40.7 | ---do------- | Do. |
| 19 | 10 | 63 | 27 | ---do------- | Do. |
| 20 | 10 | 51 | 39 | ---do------- | Do. |
| 21 | 10 | 49 | 41 | ---do------- | Do. |
| 22 | 11 | 60 | 29 | ---do------- | Do. |
| 23 | 12 | 61 | 27 | ---do------- | Do. |
| 24 | 12 | 58 | 30 | ---do------- | Do. |
| 25 | 12 | 55 | 43 | ---do------- | Do. |
| 26 | 12 | 52 | 36 | ---do------- | Do. |

The compositions set forth above in the specific examples are shown in terms of sodium hydroxide as the alkali and methanol as the alcoholic solvent and the critical compositions are based upon the use of these agents. The accompanying FIGURES I and II are ternary composition diagrams based on the use of sodium hydroxide, water and methanol and illustrate the critical areas in comparison to the area claimed in U.S. Patent 2,969,366. In FIGURE I the area ABCDEF is the critical useful area of this invention between 8% and 11% sodium hydroxide, 52% and 59% water, and 31% and 39% methanol. In contrast, the area GHIJ is that corresponding to the claims of U.S. Patent 2,969,366. The line G–H is limited by the requirement for at least as much solvent as water. The line H–I is limited by the maximum amount of alkali (120 parts per 100 parts of water) as the amount of solvent is varied. The line I–J is limited by the absolute minimum of alkali to be present (5 parts per 100 parts of total solvent); and the line J–G is limited by the minimum amount of alkali in relation to water (20 parts per 100 parts of water) as the solvent is varied. FIGURE II is a large scale representation of the area XYZ on FIGURE I. The points shown in the specific examples are plotted on FIGURE II, the points within which the improvements (25–40% product tinting strength increase) of this invention provide acceptacle products being represented by the notations (O) and the points outside which the requirements of the invention are not met and therefore provide unacceptable products being represented by the notation (X). The criticality of the useful area defined by ABCDEF is apparent from FIGURE II.

The general principles involved, apply to the use of other alkaline agents such as potassium hydroxide, lithium hydroxide and the like except that the critical amounts of the agents will vary with the equivalent weights. In a similar manner other alcohols such as ethanol and proponal may be used with proper adjustment of amounts, bearing in mind, however, the tendency of the higher alcohols to form immiscible mixtures with solutions of strong alkalies in water.

Although this invention is illustrated in terms of nitrobenzene-m-sodium sulfonate as the preferred oxidizing agent, it is well known that the oxidation of dihydroquinacridone to quinacridone may be brought about with other oxidizing agents. Other nitro-aromatic compounds are especially suitable including, for example, the salts of nitrotoluene sulfonic acid, nitrophthalic acid and even nitrobenzene itself.

The reaction conditions present during oxidation are not fundamentally different from those known heretofore, namely that the reaction be carried out substantially at the boil usually under reflux to avoid the loss of the alcohol present. However, if the prior reaction of the dihydroquinacridone with the alkali is allowed to proceed at temperatures in excess of about 40° C., the dihydroquinacridone tends to convert to its beta crystal phase and, accordingly, during the subsequent oxidation of the alkali dihydroquinacridone to quinacridone, there follows a pronounced tendency for the oxidation process to result in the manufacture of a gamma phase quinacridone instead of the desired beta phase quinacridone.

The relative amount of sodium hydroxide to dihydroquinacridone can vary over a wide range. The only requirement being that there is sufficient sodium hydroxide present to bring about a reaction with dihydroquinacridone. The working examples set forth above have actually shown the use of 180 parts sodium hydroxide per 100 parts of quinacridone but this amount may be varied over a substantial range, for example, as low as 100 parts sodium hydroxide per 100 parts quinacridone is satisfactory and quantities substantially more than the preferred amount produced satisfactory results. The higher amounts offer no advantage and hence are of no real usefulness, whereas the amounts below the optimum tend to slow up the phase conversion.

I claim:
1. A method for preparing beta phase quinacridone which comprises dispersing 6,13-dihydroquinacridone in a solution comprising, by weight, 52 to 59% water, 31 to 39% methanol and 8 to 11% sodium hydroxide and effecting reaction between the said dihydroquinacridone and sodium hydroxide while maintaining the temperature of the solution below about 40° C., adding an oxidizing agent selected from the group of nitro compounds consisting of a salt of nitrotoluene sulfonic acid, nitrophthalic acid, and nitrobenzene-m-sulfonic acid and nitrobenzene to the solution and heating said solution and recovering beta phase quinacridone.

2. A method for preparing beta phase quinacridone which comprises dispersing 6,13-dihydroquinacridone in a solution comprising, by weight, 52 to 59% water, 31 to 39% methanol and 8 to 11% sodium hydroxide and effecting reaction between the said dihydroquinacridone and sodium hydroxide while maintaining the temperature of the solution between the ambient temperature and about 40° C., adding netrobenzene sodium sulfonate to the solution and heating said solution and recovering beta phase quinacridone.

3. A method for preparing beta phase quinacridone which comprises dispersing 6,13-dihydroquinacridone in a solution comprising, by weight, 52 to 59% water, 31 to 39% methanol and 8 to 11% sodium hydroxide and effecting reaction between the said dihydroquinacridone and sodium hydroxide while maintaining the temperature of the solution between the ambient temperature and about 40° C., adding nitrobenzene sodium sulfonate to the solution and heating said solution to boil and recovering beta phase quinacridone.

4. A method for preparing beta phase quinacridone which comprises dispersing 6,13-dihydroquinacridone in a solution comprising, by weight, 56.5% water, 35.5% methanol and 8% sodium hydroxide and effecting reaction between the said dihydroquinacridone and sodium hydroxide while maintaining the temperature of the solution between the ambient temperature and about 40° C., adding nitrobenzene sodium sulfonate to the solution and heating said solution to boil under reflux and recovering beta phase quinacridone.

References Cited by the Examiner

UNITED STATES PATENTS

| | | | |
|---|---|---|---|
| 2,821,529 | 1/1958 | Struve | 260—279 |
| 2,844,485 | 7/1958 | Struve | 260—279 |
| 2,969,366 | 1/1961 | Griswold | 260—279 |
| 3,007,930 | 11/1961 | Manger | 260—279 |
| 3,072,660 | 1/1963 | Chen | 260—279 |

ALEX MAZEL, *Primary Examiner.*

NICHOLAS S. RIZZO, HENRY S. JILES, *Examiners.*

D. G. DAUS, *Assistant Examiner.*